US007827215B2

(12) United States Patent
Chao et al.

(10) Patent No.: US 7,827,215 B2
(45) Date of Patent: Nov. 2, 2010

(54) REAL-TIME OPERATION BY A DISKLESS CLIENT COMPUTER

(75) Inventors: Edward S. Chao, Lombard, IL (US); Christopher D. Liesen, Naperville, IL (US); Warren R. Smith, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1826 days.

(21) Appl. No.: 10/930,140

(22) Filed: Aug. 31, 2004

(65) Prior Publication Data

US 2006/0048143 A1    Mar. 2, 2006

(51) Int. Cl.
G06F 12/00 (2006.01)
G06F 15/177 (2006.01)

(52) U.S. Cl. .......................................... 707/827; 713/2
(58) Field of Classification Search .................. None
See application file for complete search history.

(56) References Cited

U.S. PATENT DOCUMENTS

| 5,802,297 | A  | * | 9/1998  | Engquist ..................... 709/212 |
| 5,948,101 | A  | * | 9/1999  | David et al. .................... 713/2 |
| 6,202,091 | B1 | * | 3/2001  | Godse ......................... 709/222 |
| 6,279,109 | B1 | * | 8/2001  | Brundridge .................... 713/2 |
| 6,334,149 | B1 | * | 12/2001 | Davis et al. .................. 709/219 |
| 6,421,777 | B1 | * | 7/2002  | Pierre-Louis et al. ........... 713/2 |
| 6,463,530 | B1 | * | 10/2002 | Sposato ......................... 713/2 |
| 6,466,972 | B1 | * | 10/2002 | Paul et al. .................... 709/222 |
| 6,643,772 | B1 | * | 11/2003 | Aguilar et al. ................. 713/2 |
| 7,120,837 | B1 | * | 10/2006 | Ferris .......................... 714/56 |
| 7,246,221 | B1 | * | 7/2007  | Soltis et al. ................... 713/1 |
| 7,248,582 | B2 | * | 7/2007  | Belgaied et al. ............. 370/392 |
| 2003/0156582 | A1 | * | 8/2003  | Belgaied et al. ............. 370/389 |
| 2004/0078729 | A1 | * | 4/2004  | Peter ........................... 714/54 |
| 2004/0229199 | A1 | * | 11/2004 | Ashley et al. ................ 434/323 |
| 2005/0201299 | A1 | * | 9/2005  | Radi et al. ................... 370/254 |

OTHER PUBLICATIONS

Sun Microsystem, "Solaris 8 Operating Environment System Administration II", dated May 30, 1996, pp. 8-8 and 8-17.*
Sun Microsystem, "system Administration Guide: Devices and File Systems", dated Jul. 27, 2004, pp. 298 and 302.*

* cited by examiner

Primary Examiner—Neveen Abel Jalil
Assistant Examiner—Tarek Chbouki
(74) Attorney, Agent, or Firm—Carmen Patti Law Group, LLC

(57) ABSTRACT

An exemplary method controls the operation of a diskless client computer using a disk based operating system. The client computer is booted by fetching operating system modules through a network connection from a remote host computer. A ramdisk stores key operating system modules. The key operating system modules are locked in ramdisk to prevent swapping of the modules by the operating system. The loading of programs requiring real-time operation stored at the host computer are managed so that the programs are loaded as separate modules spaced-apart in time where the client computer is released between the loading of the separate modules to process other tasks.

15 Claims, 5 Drawing Sheets ized operating system at each client. It also facilitates the roll-back of software changes since the previous version of such software and related operating system can be maintained at the host computer.

REAL-TIME OPERATION BY A DISKLESS CLIENT COMPUTER

BACKGROUND

This invention generally relates to a computer system using a disk based operating system and more specifically addresses operation of a client computer running real-time programs among its plurality of programs while in a computer network where the client computer uses a disk based operating system but does not have a local hard disk and relies on a remote host computer to initially provide disk based operating system information.

FIG. 1 illustrates a known computer network 10 that includes a host computer 12 connected by a communication network 14 to a plurality of client computers 16. The communication network 14 may comprise an Ethernet network or a network running a form of Internet Protocol communications. The client computers 16 in a typical application will include a microprocessor utilizing a disk based operating system supported by random access memory and a disk for non-volatile storage, e.g. typically a hard drive. Each client computer is booted initially based on information contained in the disk based operating system contained on its local hard drive. In this environment each client computer operates substantially as a stand-alone computer that includes communication capabilities with the host computer 12 and other client computers. Such client computers place a relatively low traffic load on the communication network 14 for information essential for operation of each client computer since each contains its own operating system.

Another environment with the same physical configuration as shown in FIG. 1 is based on client computers that do not have a local hard drive. In this environment each client computer includes a network bootable component permitting the client computer to communicate with the host computer and load all of the necessary operating system elements from the host computer into random access memory at the client computer. In this configuration each client computer relies upon the continuous availability of communications with the host computer through the communication network to obtain new or refreshed operating system information as required. This causes a substantial amount of traffic on the communication network since many maintenance and application tasks running at the client computer require operating system access and/or updating. Such loading is exacerbated when the client computer functions in a real-time operating mode and as the number of client computers increase. As such loading continues to increase, either the processing capabilities of the host computer or the communication throughput of the communication network will become exhausted and will lead to a crash of one, if not all, of the client computers. Even if such loading does not totally exhaust the capabilities of the host computer or the communication network, excessive loading can cause the response times to be larger than can be tolerated by the client computers and will also lead to crashes of the client computers. There exists a need for a solution to such problems.

SUMMARY

It is an object of the present invention to minimize difficulties associated with this problem.

An exemplary method controls the operation of a diskless client computer using a disk based operating system. The client computer is booted by fetching operating system modules through a network connection from a remote host computer. A ramdisk stores key operating system programs, shared libraries, and data hereafter referred to as modules (portions or pieces of the totality of an executable program or programs). The key operating system modules are loaded on ramdisk to provide constant and quick availability of the executables and data to the operating system. The loading of programs requiring real-time operation stored at the host computer is managed so that these programs are loaded as separate modules spaced-apart in time where the client computer is released between the loading of the separate modules to process other tasks. The real-time programs are loaded in entirety and are locked into memory.

An exemplary client computer and an article including one or more computer-readable signal-bearing media are also presented.

DETAILED DESCRIPTION

Figure 1:
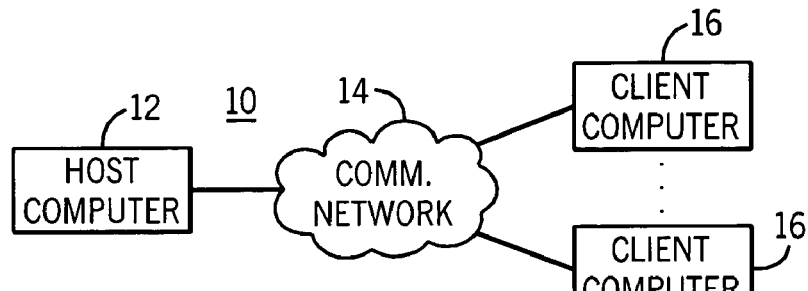
FIG. 1 illustrates an exemplary computer network 10 known in the art.
Figure 2:
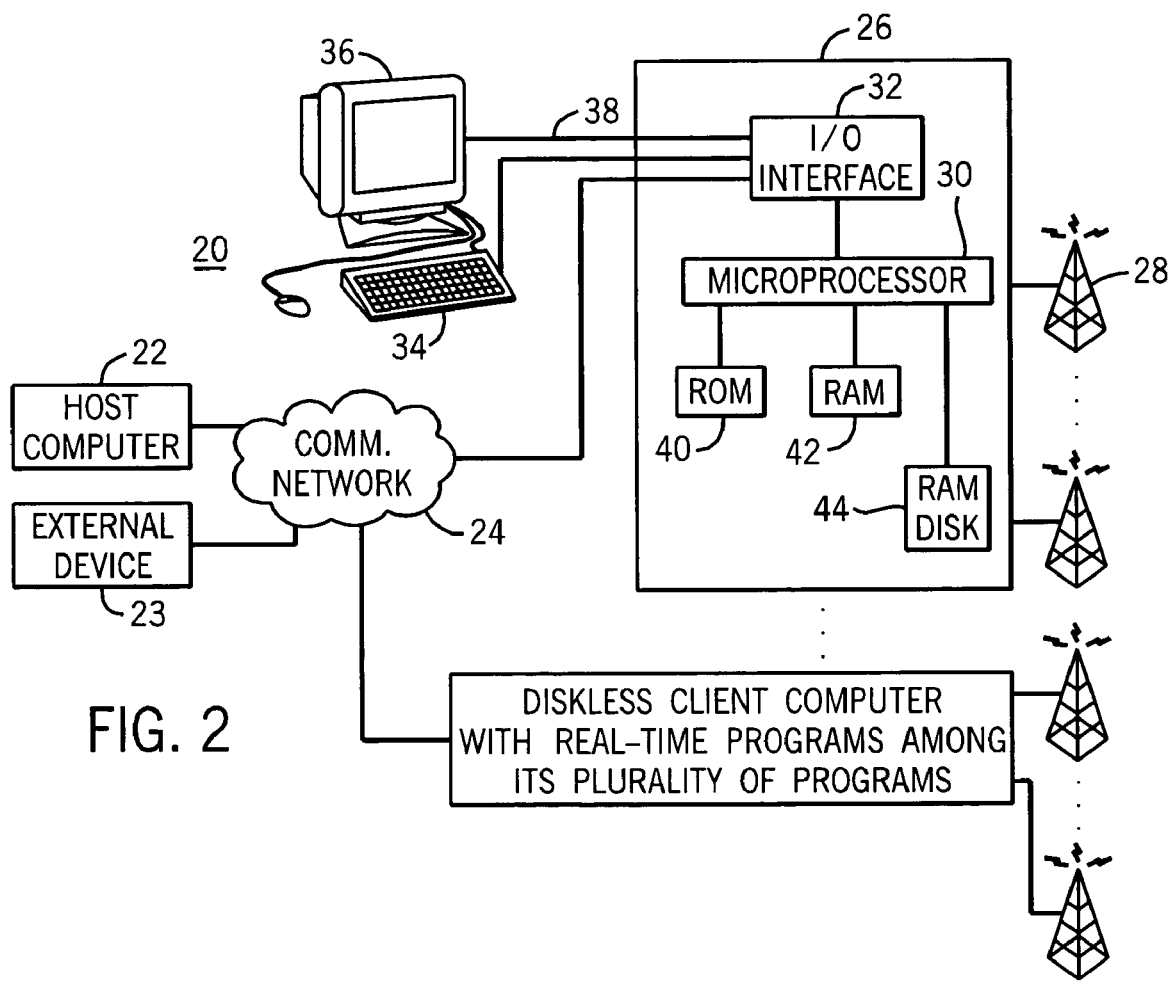
FIG. 2 is a block diagram of an exemplary computer network 20 in accordance with the present invention.

The exemplary embodiment of the present invention will be described for use with a client computer with a UNIX disk based operating system such as available from Hewlett-Packard and Solaris. However, it will be understood that other computing systems with disk based operating systems that have similar needs can also benefit. This embodiment is especially, but not exclusively, adapted to enable client computers to be utilized in a computer network supported by a host computer where each client computer utilizes a disk based operating system, e.g. a general purpose UNIX operating system, but contains no local hard disk. The techniques and methods described herein greatly reduce the loading/traffic placed on the host computer by each client computer, minimizes the potentially long uninterruptible task processing required by the client computer, and enable a plurality of such client computers to be supported by a host computer.

There are advantages to utilizing diskless client computers served by a host computer in a computer network. The diskless client computers are substantially more cost-effective than client computers that require at least one local hard drive especially in high reliability environments requiring high quality and/or redundant hard drives. Diskless client computers take up less volume than a computer with a hard drive and hence can achieve greater densities in a rack or frame. The distribution of software upgrades and modifications is simplified since changes made to the software on the host computer can be easily reflected to each of the client computers without requiring maintenance and modifications to a program stored on a local hard disk at the client computers. The ability to use a general purpose, i.e. not proprietary, UNIX operating system instead of a custom embedded operating system saves on development time and costs, and allows application software designed for the standard UNIX operating system to be run without being custom modified to work with a proprietary embedded operating system.

Aspects of the present invention include the recognition of causes of difficulties associated with attempts to utilize diskless client computers running a disk based operating system in a computer network. Challenges in identifying the causation of such difficulties and providing corresponding solutions are exacerbated where the diskless client computers must support real-time processing among its plurality of programs. As used herein, real-time processing means a task scheduled off of a periodic timer driven interrupt where the task runs to completion. A real-time executable program has a longer life than one task. It waits or sleeps for a stimuli to cause it to do the next task. For example, a call processing program wakes up and runs a call task each time a customer dials a phone call and sleeps in between each call task waiting for the next call to be dialed. Real-time processing also means a processing task responds to stimuli within some upper limit of response time. Each of the aspects of this invention has individual merit as well as in combination with other aspects and features described herein.

One aspect of the present invention resides in recognizing that the traffic created by a diskless client computer in loading a program from the host computer should be controlled to minimize the possibility of a crash at the client computer due to processing capability monopolization for a substantial interval of time especially for loading a relatively large program, e.g. 10 megabytes, and minimizes the possibility of a crash at the host computer 22 by monopolizing its processing capability for a substantial interval. An embodiment of the present invention is adapted for controlling the loading of a program stored on the hard disk of a host computer into memory of a client computer where the operating system, without the benefit of the present embodiment, would normally cause the initial pieces of the program (a large portion of the program that the operating system initially deems to be necessary) to be loaded in one continuous, uninterrupted, processing task by the microprocessor of the client computer. In accordance with the embodiment of the present invention, a program that requires longer than a predetermined time to be so loaded is automatically loaded as time separated modules so that the microprocessor of the client computer and host computer can attend to other tasks between the loading of the modules. As the modules are loaded, the number of pages loaded into memory is preferably automatically adjusted to maximize the number of pages that can be loaded during the targeted time allotted for loading of each module. Also, the embodiment of the present invention is adapted to load a program that will be processed in real-time in its entirety and lock the loaded memory so that the upper limit of response time is not exceeded if the program is loaded piecemeal from disk throughout the life of the real-time processed task and/or if portions of the program were swapped back from disk to memory and had to be retrieved again.

Another aspect of the present invention resides in recognizing that the number of times the client computer is required to load and/or refresh its operating system components from the host computer should be minimized. This is at least partially addressed by utilizing a ramdisk at the client computer into which key components of the exemplary UNIX disk based operating system is loaded and locked. Information on the ramdisk is periodically synchronized at a metered rate to maintain persistence of the files mounted on the ramdisk to the remote hard disk located in host computer. A further technique that contributes to a solution of these needs resides in recognizing that real-time application programs and kernel operating system utility programs should be locked once loaded into memory of the client computer. This permits these applications and utility programs to operate and meet expected upper limit of response time even if delays on the order of several minutes are encountered in obtaining new updated information related to the applications and utility programs from the host computer. An example of such a delay would be if the host computer crashed and had to reboot before resuming processing of information updates.

Another aspect of the present invention resides in addressing the normal memory/disk swapping technique required because of the size disparity between the amount of RAM memory available at a client computer and the nominal amount of memory typically utilized by the disk operating system. The amount of RAM memory available in a client computer is substantially less than the amount of memory required to mount substantially all of the disk operating system and client programs. In a prior art computer having a local hard disk, this problem is resolved by swapping information between the RAM memory and the hard disk. This so-called disk swapping approach is workable when relatively low time delays associated with the swapping is present such as where a local hard disk is available for direct access. However, in the diskless client computers utilized in accordance with the present invention, such disk swapping would require swapping information contained in the RAM of the client computer with the hard disk contained on the host computer. Access contention at the host computer, nominal delays associated with the host and client computers, and communication network delays result in a cumulative time delay that will be unacceptable for many client computer applications, especially where real-time processing is required by the client computer. In accordance with an embodiment of the present invention, this problem is minimized by locking certain modules of information loaded into RAM memory at the client computer to prevent disk swapping of the certain modules while permitting other information stored in RAM memory at the client computer to be swapped between the RAM memory and the hard disk at the host computer. More specifics concerning the information in RAM memory that is locked is provided below.

Figure 3:
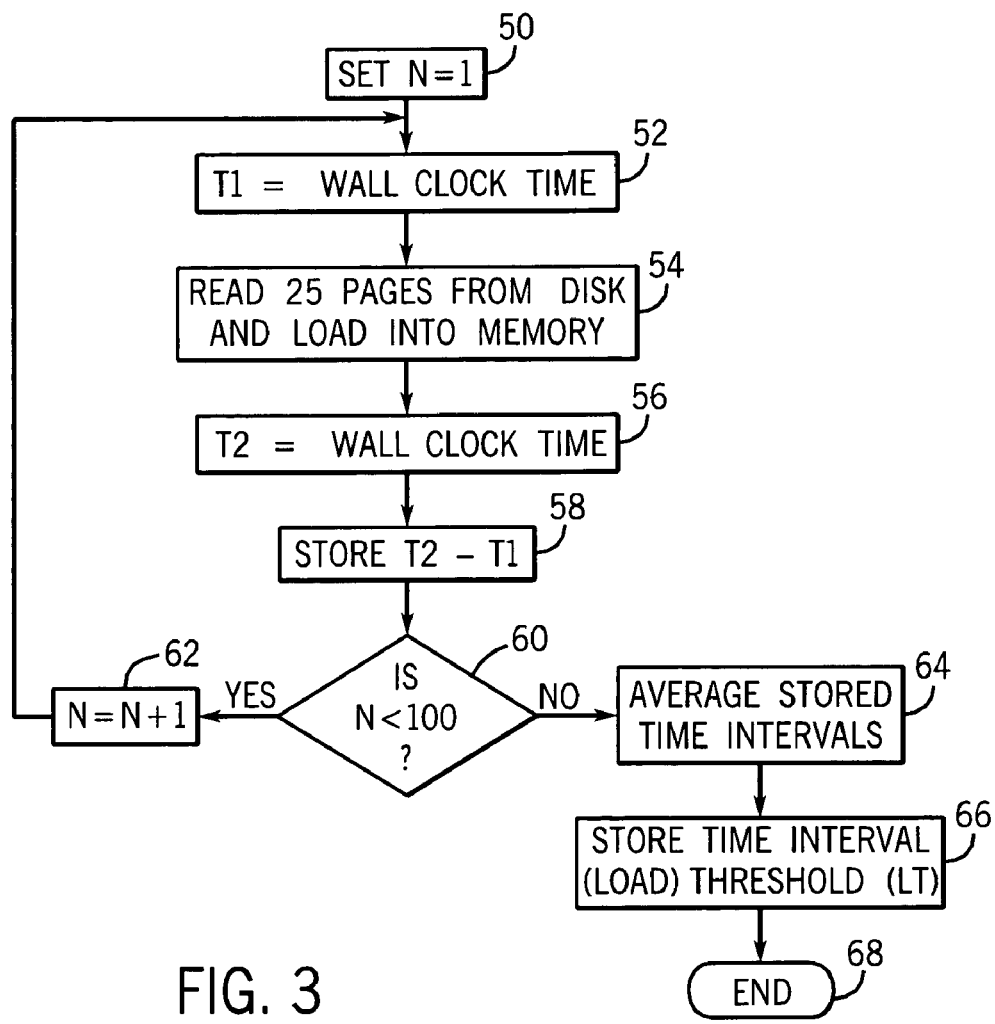
FIG. 3 is a flow diagram of an exemplary method for determining a threshold time in accordance with one aspect of the present invention.

FIG. 3 is a flow diagram of steps in an exemplary method in accordance with the present invention for determining a target time interval (loading threshold—LT) that will be allocated to the loading of each module of the program to be loaded. The steps in FIG. 3 are preferably executed from a call placed in the computer system startup scripts at a point where the computer system executes only 1 task at a time (single user mode) prior to entering a mode where a plurality of tasks are executed (multi-user mode). In step 50 variable N is set equal to 1. In step 52 a wall clock time is measured and stored as T1. As used herein a "wall clock time" refers to a time measured on a running chronological clock that is preferably of high accuracy. The time may be represented as a conventional time measurement based on hours, minutes, seconds, etc. or maybe represented by a number representative of an instant of time. In step 54 the microprocessor causes 25 pages to be read from the disk drive via an application page fault, loaded and locked into RAM memory. In the illustrative example, work is denominated in terms of pages, where a typical page size might be 8192 or 65536 bytes. Information is read and loaded on a page basis. Causing a page to be read into memory from disk for purposes of this embodiment is hereafter referred to as application page faulting. It is only necessary to request the operating system to read one byte at a memory address contained within the page. This read causes a page fault (a default operating system action where the operating system transfers all bytes contained in the page from the disk into memory) of the entire page into memory. The operating system uses the memory map established for the executing instance of the executable program to understand the location of the bytes on disk vis-à-vis the location of the bytes in memory. As used herein to "lock" a page in memory means to prevent information loaded into the page from being swapped from memory back to the hard disk. In step 56 the wall clock time is again measured and stored as T2. In step 58 the elapsed time between T2 and T1 is stored in memory. This elapsed time represents the cumulative time required to access, load and lock 25 pages into RAM memory from the hard disk. If the information to be loaded into RAM memory in a local computing system is resident on a hard drive or other data storage device located in an external network, delays in the communication links between the computing system and the data storage device in the external network is included in the measured elapsed time.

In step 60 a determination is made of whether N is less than 100. A YES determination by step 60 results in step 62 incrementing N, i.e. N=N+1. Control then returns to the input of step 52 where another elapsed time measurement will be made. A NO determination by step 60 represents that 100 such elapsed time measurements have been made and results in step 64 averaging the stored elapsed time measurements resulting in the calculation of an average elapsed time. This average elapsed time is preferably multiplied by 1.5 or some other linear scalar. (This elapsed time is preferably calculated when the computer system is running only one task. When the computer system is later running a plurality of tasks, some additional overhead must be planned into the threshold). In step 66 a load threshold (LT) time interval is stored and is based on the average elapsed time multiplied by the linear scalar. Depending upon the specific application and computing environment, the LT time interval that is selected should be an acceptable, uninterruptible processing interval. The actual LT time interval calculated via FIG. 3 is based on the average elapsed time, and factors in the speed of the subject microprocessor, memory latency, and disk latency. It will be understood that amounts of memory other than 25 pages and other than 100 elapsed time measurements can be utilized. The specific amount of memory to be fetched and the number of elapsed time measurements to be made can be advantageously selected to better reflect differing capabilities of various computer systems.

An alternative to the method described in FIG. 3 would be to manually select a time interval and manually store the selected time interval at a memory location or in a system accessible variable. However, such a manual derivation of a target time interval would not benefit from testing the actual system to be used and hence may not accurately account for time delays experienced by the computer system. System/program requirements that may specify maximum time intervals within which certain tasks must be completed may override the calculated LT value. The LT value is preferably not larger than 50% of such a required maximum time interval. In such a case, it may be desirable to manually select the interval.

Figure 4:
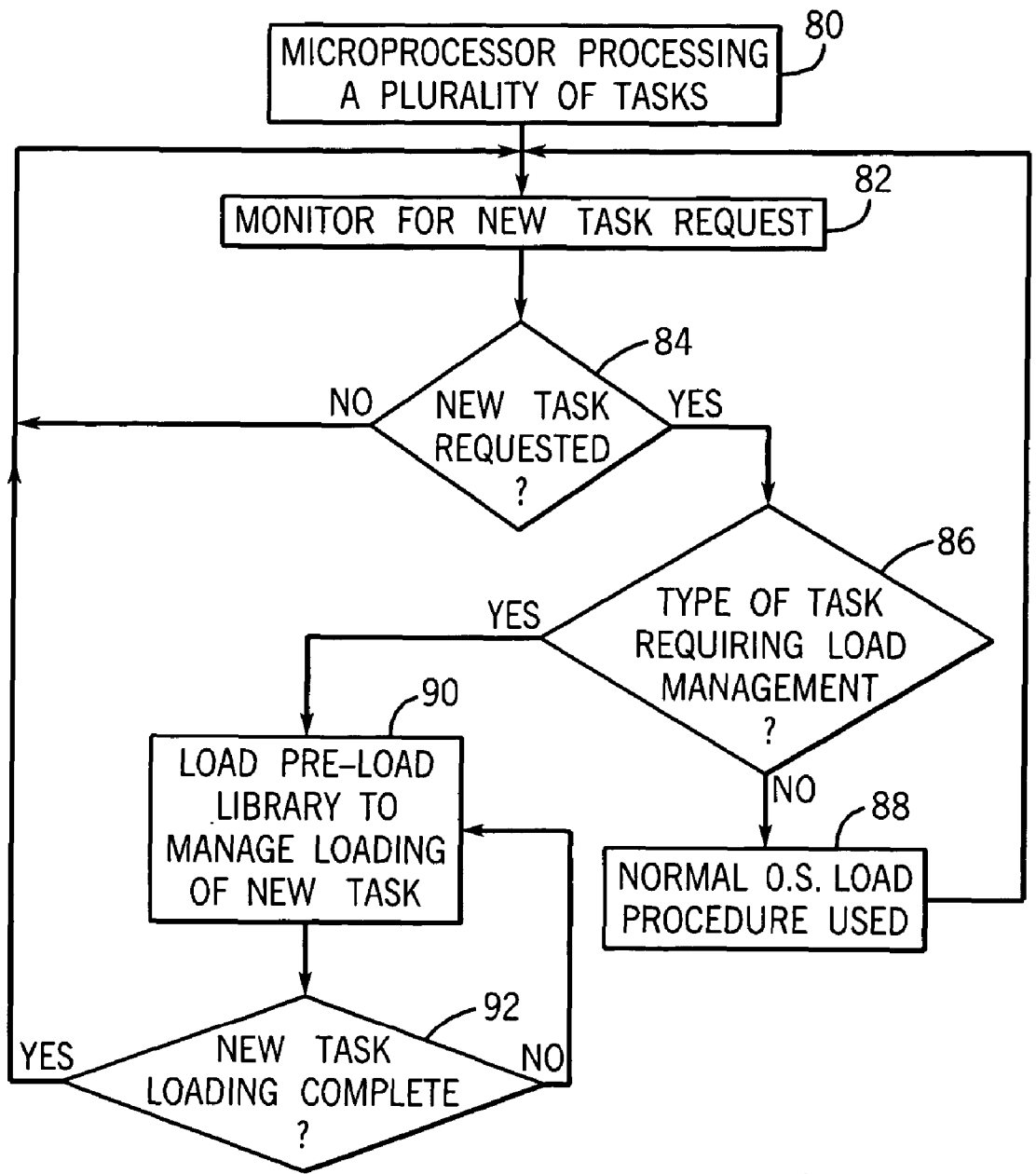
FIG. 4 is a flow diagram of another exemplary aspect of a method in accordance with the present invention for controlling the time a microprocessor is occupied with carrying out a requested task.

FIG. 4 is a flow diagram of an exemplary method for controlling the time a microprocessor is occupied with carry out a requested task. The exemplary method effectively interposes a load control function ahead of the normal load control function embedded in the disk based operating system in order to more effectively control the loading of an executable program from hard disk into RAM memory as a series of modules. In the illustrative example the operating system is a disk based UNIX operating system which would, without the benefit of the exemplary embodiment, react to a request to load an executable program in a real-time environment by causing a continuous, uninterruptible loading of the executable program until the complete executable program was loaded.

Step 80 represents a microprocessor that is processing a plurality of tasks. In step 82 new task requests are monitored, i.e. the presence of a request to be presented to the microprocessor to initiate a new task such as loading an executable program is detected. For example, this may comprise monitoring for specific types of system calls associated with the loading of an executable program in the UNIX disk based operating system. This invention can best be implemented by interposing the UNIX init call immediately prior to init calling Static Constructors. This invention can also be interposed on the command to map a new range of memory sometimes called mmap to handle startup loading or later dynamic creation or mapping of large memory blocks. In step 84 a determination is made of whether a new task has been requested. A NO determination by step 84 results in processing returning to the beginning of step 82. A YES determination by step 84 means that a new task has been requested and results in step 86 making a determination of whether the type of task requires load management. For example, a load request of an executable program in a real-time environment would be one type of request requiring load management. Also, a request to load certain non-real-time executable programs may require load management where such programs have a large memory footprint and are loaded from remote disks accessed via an external network as shown in FIG. 1 via network 18 from disk 25 through the help of computer 27. Even though requests from a non-real-time executable are run at non-real-time, low-level tasks caused by such requests, i.e. transferring data from disk to memory, executed via hardware interrupts will delay even real-time tasks. A NO determination by step 86 results in step 88 causing the normal operating system load procedure to be used in response to the request. The processing is then returned to the beginning of step 82 to await a new task being requested.

A YES determination by step 86 indicates a task has been requested that requires load management. This results in step 90 causing a pre-load library and an associated load managing function contained in a load management program to be loaded. Step 90 as discussed in greater detail with regard to FIG. 5. In step 92 a determination is made of whether the loading of the new task (executable program) is complete. A NO determination by step 92 results in control returning to step 90 to continue management of the loading. A YES determination by step 92 results in processing continuing to the input of step 82.

Figure 5:
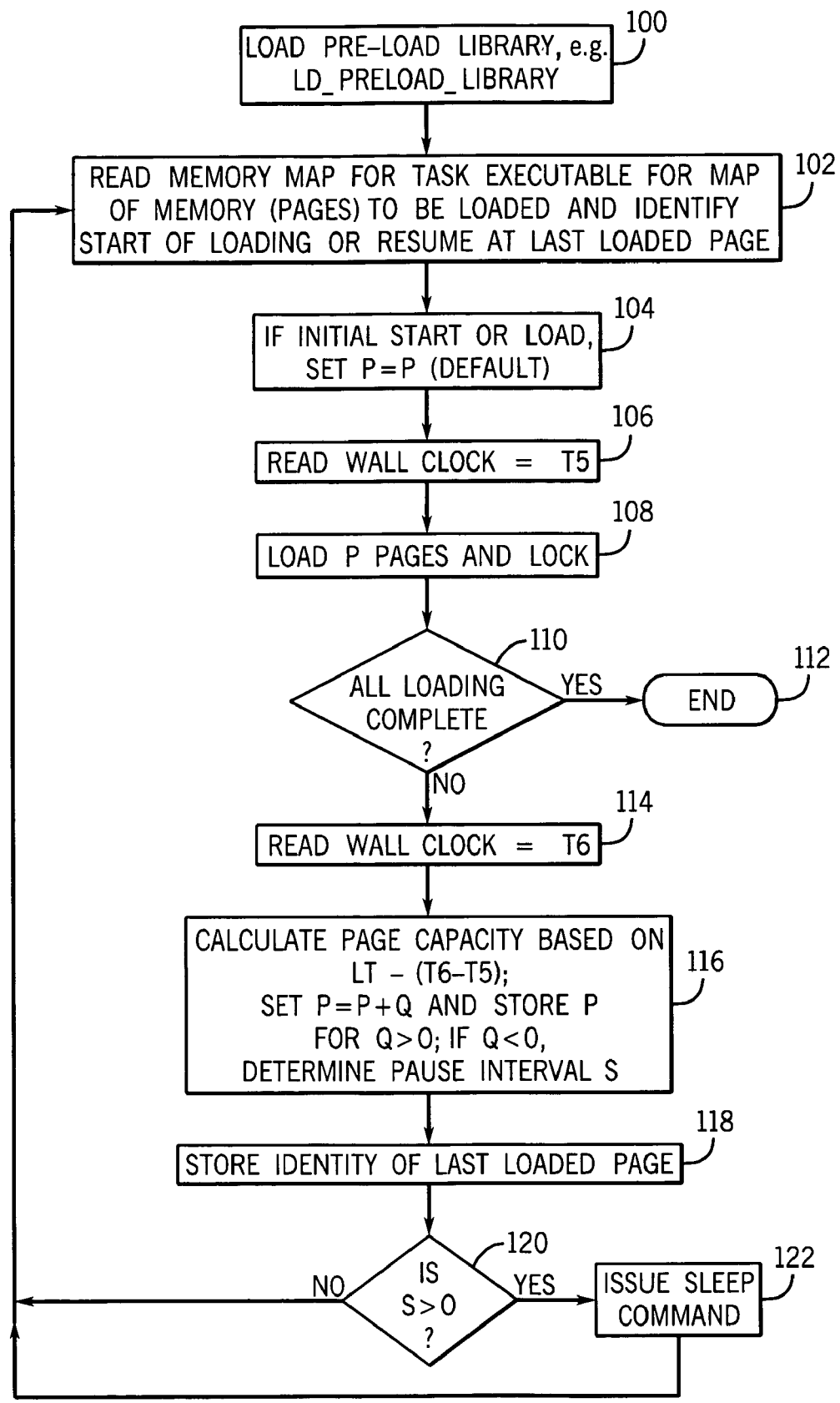
FIG. 5 is a flow diagram of an embodiment further illustrating exemplary steps for implementing step 90 as shown in FIG. 4.

FIG. 5 is a flow diagram showing exemplary steps for implementing step 90 of FIG. 4. In step 100 a pre-load library is loaded such as by using the UNIX command "LD_PRE-LOAD_LIBRARY". This action is taken at the beginning of execution of a request to run an executable program. After the executable program starts to run, this instance of the executable will be known as a process. The process of FIG. 5 interposes itself as the program starts to run. The UNIX operating system only loads a small part of the executable program into memory. Additional pieces of the program will be loaded when they are needed by the program. When each additional piece is needed, the program will be delayed while the piece is read from disk. This invention interposes itself into the startup of the executable process before initial pieces of the executable program are loaded from hard disk into RAM memory. In step 102 the process memory map associated with the executable program that is starting up is read in order to obtain a map of memory (pages) from which the executable program is to be loaded or mapped into memory. This memory map information is provided as part of the UNIX operating system functionality. The page at which the loading is to begin is identified (the lowest memory address range in the map). During the initial startup the first set of pages (first module), the address of the page at which loading of information is to begin is also provided as part of the memory map information. The UNIX process memory map contains a table in which each row shows a beginning memory address, the amount of memory and a label identifying the type of program module to be loaded at this location. In step 104 a variable P is set to a default value, e.g. 100 pages, at the initial loading of the executable program into RAM memory. In step 106 a wall clock is read and stored as variable T5. In step 108 "P" pages of information are application page faulted from the hard disk, causing them to be stored in RAM memory at the memory address read from the memory map, and locked. A determination is made in step 110 of whether the entire executable program, i.e. the entire set of memory mapped address ranges, has been loaded. A YES determination by step 110 results in the processing terminating as indicated at END step 112.

A NO determination by step 110 results in the reading of the wall clock which is stored as variable T6. In step 116 a page capacity calculation is made based on LT−(T6−T5) where LT is the target load threshold time interval and (T6−T5) represents the time interval required to application page fault and lock the P pages into RAM memory. This is generally intended to refer to a comparison of these two time intervals and is not limited to the specific mathematical expression shown. If there is a positive value when the difference between these two time intervals is subtracted from LT representing the time to process the number of pages P, a calculation is made to determine an amount of pages Q that could be added to P for future iterations. For example, Q can be calculated using a linear interpolation. A positive value of Q indicates that additional pages can be processed during LT. For Example if (T6−T5) took less than LT, a Q value is created that is set to 10% of P. Step 116 then sets P equal to a new value: P+Q, where this new value of pages P to be processed is stored for use during the next load iteration (next module) of the subject executable program. If there is a negative value from LT−(T6−T5), it is necessary to pause the processing of pages for some amount of time S. For example S could be set equal to the absolute value of (LT−(T6−T5))*5. To "pause" means that an operating system provided call such as sleep is used. This means that a timer is established with duration S and is entered into the operating system's timer queue. The program then voluntarily gives up the microprocessor and stops running. When the microprocessor is given up, the computer system is free to run any other of its plurality of tasks. When the timer expires, the program starts running again. In step 118 the identity of the last processed page is stored in memory and is used by step 102 during the next iteration to assist in determining the next page to be processed prior to issuing the sleep. A determination is made is step 120 of whether S>0, i.e. if a pause is to be executed. A NO determination at step 120 causes processing to return to step 102 for processing of more modules. A YES determination at step 120 results in a sleep (pause) command to be issued in step 122. Following the sleep interval in which the microprocessor works on other tasks, processing resumes at step 102 for processing of more modules.

Figure 6:
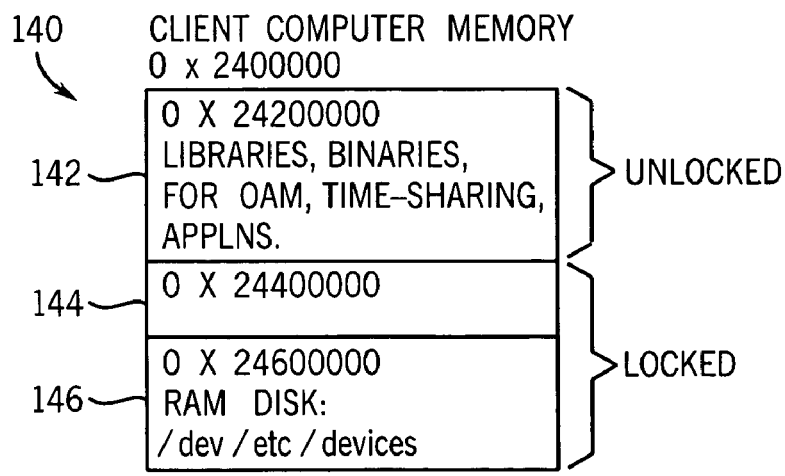
FIG. 6 represents exemplary memory of a client computer.

FIG. 6 shows an exemplary use of RAM 140, e.g. 0x2400000 (hexadecimal notation) in the client computer. An unlocked portion 142 (0x2420000) of RAM may contain programs and modules for which time critical processing is not required such as libraries, binary files/modules for operations, administration and maintenance, and time-sharing applications. A locked portion 144 (0x2440000) of RAM may contain programs and modules for which time critical processing is required such as programs to complete wireless cellular phone calls and to reroute cellular calls from one cellular radio tower to another. A portion 146 (0x2460000) of RAM is configured as a ramdisk, i.e. an area of memory in which information is stored and accessed as if it were stored in a disk drive. From the operating system perspective, a ramdisk is just another designated disk device, although the access speed for retrieving information from and writing information to a ramdisk is substantially faster than such operations on an actual disk drive. In this example, the UNIX disk operating system modules: the kernel bootable image, root file system, and device and driver file directories (/dev, /etc /devices) are mounted on the ramdisk and ramdisk memory is locked to prevent swapping of these modules from the ramdisk with other RAM.

Figure 7:
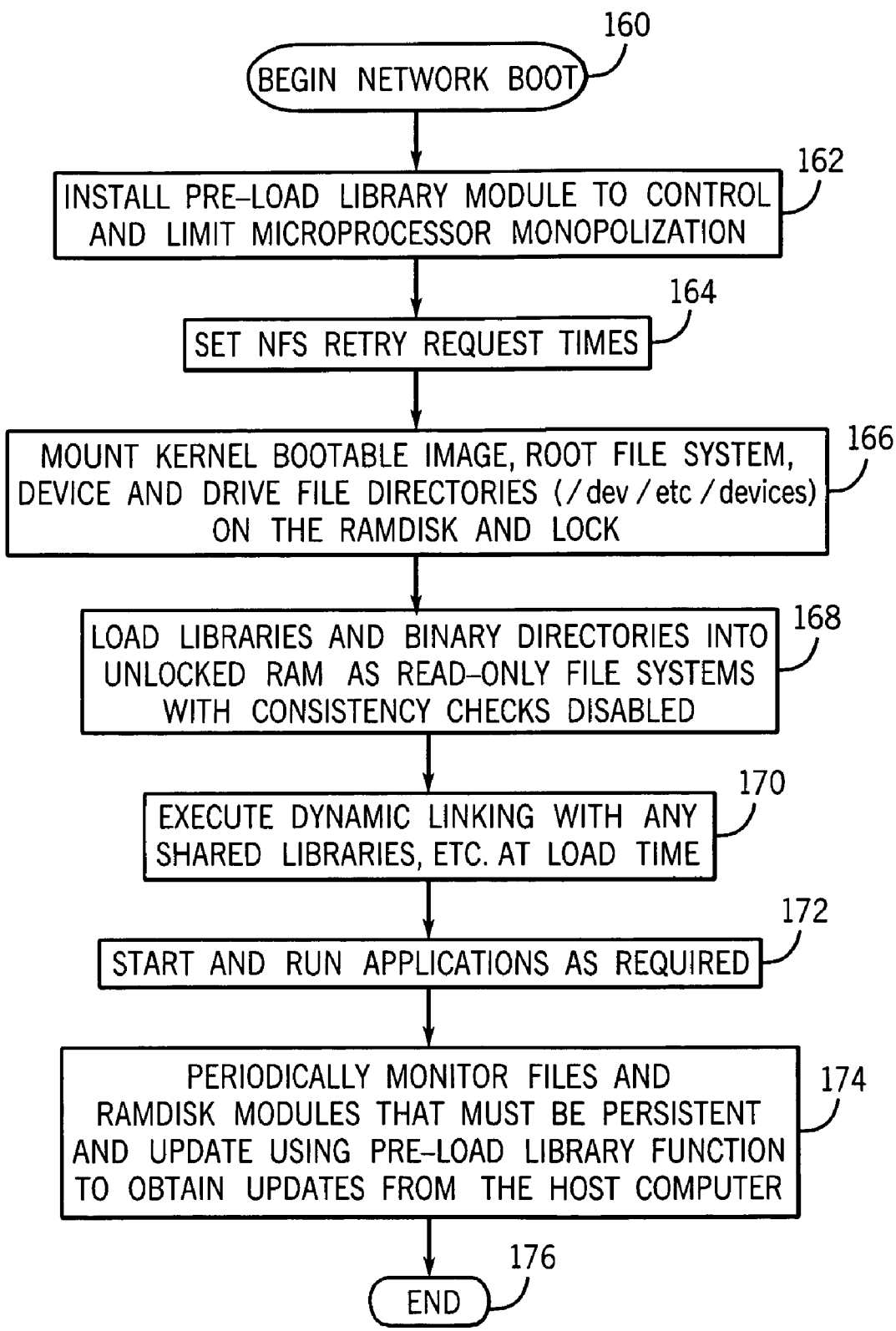
FIG. 7 is a flow diagram of an exemplary method for operation of a client computer in accordance with the present invention.

FIG. 7 is a flow diagram of an exemplary method for operation of a client computer. In this example, a diskless client computer is using a general purpose UNIX disk based operating system and is coupled through a communication network to a host computer that serves the client computer as well as other client computers. In step 160 an initial "cold start" of client computer begins with a network boot cycle in which at least basic operating code stored in ROM enables the microprocessor of the client computer to establish communications with the host computer including the downloading of files from the host computer. For example, the Network File System (NFS) protocol provides a way to access files stored on the host computer. In step 162 a Pre-load Library Module is downloaded from the host computer and installed at the client computer to limit microprocessor monopolization at the client computer. Preferably, the pre-load library module is made active as soon as possible in order to provide metered control of the remaining elements to be loaded into the client computer. In step 164 the NFS retry times are preferably set to be equal to or longer than the longest temporary NFS outage or time delay for which the client computer can operate without support from the host computer. While NFS is an exemplary method, there are other software programs and protocols that allow a client computer 16 to mount a file system from a remote host computer 12. For any of these mechanisms, the retry times are preferably set to be equal to or longer than the longest temporary network/host computer outage or time delay for which the client computer can operate without support from the host computer persistent storage.

Information is retrieved from the host computer and stored into ramdisk at step 166. Herein "mount" refers to an existing mechanism through which a computer system is told how file systems are attached and where they are at such as on local disk, remote disks, ramdisks, etc. This will typically include mounting the kernel bootable image, root file system (/), and device and drive file systems (/, /dev, /etc, and /devices) into ramdisk whose RAM contents are locked which prevents files and programs from swapping. In step 168 programs and files that are not time critical such as libraries and binary directories are loaded into unlocked RAM when executed and whose file systems are mounted as read-only file systems with consistency checks disabled. A file system that is mounted read-only with consistency checking disabled allows a client computer 16 to download contents once and only once without rechecking periodically with Host Computer 12 to see if the contents have changed. This in turn enormously reduces the traffic necessary between the host and client. In step 170 the operating system executes dynamic linking with shared libraries or programs at load time as opposed to executing dynamic linking later at runtime. This embodiment via an operating system environment variable (RAM memory location) tells the operating system to give the executable program this treatment. The UNIX disk based operating system provides this mechanism of being notified that programs starting up want load time linking as opposed to dynamic linking which could occur when needed at any future point in program execution. This load time linking establishes all memory mapping ranges in the program's memory map file for the shared library at load time prior to the method in FIG. 5 running so that the executable program receives the benefits of the FIG. 5 method for these shared library memory ranges. In step 172 applications are started and run on the client computer as required. In step 174 files and ramdisk modules that must be persistent are periodically monitored and updated using the pre-load library function to make updates for RAM changes to the persistent disk based storage on the host computer. For example, a file/variable containing a password as well as certain operating system modules must be periodically updated in order to remain synchronized with the remainder of the computer network. The pre-load library function enables such updates to be made on a controlled and metered basis without causing undue disruption of the processing capabilities of the microprocessor of the client computer. Since the client computer is now in an operational state and capable of performing its intended functions, the explanation of processing terminates at END 176.

Although embodiments of the invention have been described above and shown in the drawings, various changes, additions and deletions can be made by those skilled in the art without departing from the spirit of the invention. For example, techniques other than wall clock time measurements are known for determining a time interval. It may be desirable to utilize the subject modular program loading technique for non-real-time program loading requests such as where an exceptionally large program is to be loaded or where other tasks are being processed that place constraints on the maximum time that can elapse before the resumption of such processing. "RAM" is intended to include all types of memory from which a microprocessor can directly execute programs. "Hard disk and disk" include all forms of information storage from which information must be first transferred to RAM before a microprocessor can execute it. Although the illustrative embodiment is explained in a computer system using a UNIX disk based operating system, those skilled in the art will appreciate that other disk based operating systems could also benefit. The order of execution of the illustrative steps can be changed to accommodate different design priorities as long as the method operates to achieve the final goal. The ramdisk can be configured as part of the RAM of the client computer or a separate ramdisk can be utilized. It will be apparent that since the client computer can function in a real-time environment and execute real-time applications, it can also handle and process non-real-time (time shared) applications. The scope of the present invention is defined by the following claims.

We claim:

1. A method for operating a diskless client computer using a disk based operating system where the client computer system must accommodate at least certain real-time applications, the method comprising the stops of:
    booting the client computer by fetching operating system modules through a network connection from a remote host computer;
    storing key operating system modules in a ramdisk as part of the booting of the client computer;
    locking the key operating system modules in ramdisk to prevent swapping of said modules by the operating system as part of the booting of the client computer;
    loading library and binary directories into random access memory as read-only files with consistency checking disabled as part of the booting of the client computer;
    managing the loading of programs stored at the host computer requiring real-time operation so that the programs are loaded as separate modules spaced-apart in time where the client computer is released between the loading of the separate modules to process other tasks;
    setting a value that corresponds to a time interval that will cause a time out error due to delay in obtaining requested information from the host computer, the value being set to be at least equal to the longest time interval that the client computer is to remain operational without being able to access the host computer.

2. The method of claim 1 further comprising the step of using a general purpose UNIX disk based operating system for the client computer.

3. The method of claim 2 wherein the step of storing comprises storing only a kernel bootable image, root file system, and device and driver file directories in the ramdisk as part of the booting of the client computer, and the step of locking comprises locking the kernel bootable image, root file system, and device and driver file directories in the ramdisk as part of the booting of the client computer.

4. The method of claim 1 further comprising the step of causing dynamic linking of shared files to be performed prior to the execution of the shared files.

5. The method of claim 1 wherein the managing step periodically updates at least files stored in ramdisk that must be persistent by loading a newer version of the at least files from ramdisk to persistent hard disk storage of the host computer.

6. A disldess client computer using a disk based operating system where the client computer system must accommodate at least certain real-time applications, the client computer comprising:
    microprocessor operating under instructions initiates a boot process by fetching operating system modules through a network connection from a remote host compute~, ramdisk adapted to store key operating system modules as part of the booting of the client computer,
    the microprocessor causing the key operating system modules to be locked in ramdisk to prevent swapping of said modules by the operating system as part of the booting of the client computer;
    the microprocessor loading library and binary directories into random access memory as read-only files with consistency checking disabled as part of the booting of the client computer; the microprocessor operating under instructions for managing the loading of programs controls the loading of programs stored at the host computer requiring real-time operation so that the programs are loaded as separate modules spaced-apart in time where the microprocessor is released between the loading of the separate modules to process other tasks;
    The microprocessor causing the setting a value that corresponds to a time interval that will cause a time out error due to delay in obtaining requested information from the host computer, the value being set to be at least equal to the longest time interval that the client computer is to remain operational without being able to access the host computer.

7. The diskless client computer of claim 6 wherein the microprocessor operates using a general purpose UNIX disk based operating system.

8. The diskless client computer of claim 7 wherein the ramdisk only stores a kernel bootable image, root file system, and device and driver file directories, where the kernel bootable image, root file system, and device and driver file directories are locked in the ramdisk.

9. The diskless client computer of claim 6 further comprising the microprocessor executing instructions to cause dynamic linking of shared files to be performed prior to the execution of the shared files.

10. The diskless client computer of claim 6 wherein the microprocessor operating under the managing instructions periodically updates at least files stored in ramdisk that must be persistent by loading a newer version from the ramdisk down to the host computer.

11. An article, comprising:
one or more computer-readable tangible storage medium;
means in the one or more medium for booting a client computer by fetching operating system modules through a network connection from a remote host computer;
further means in the one or more medium for storing key operating system modules in a ramdisk located in the client computer as part of the booting of the client computer;
further means in the one or more medium for locking the key operating system modules in ramdisk to prevent swapping of said modules by an operating system as part of the booting of the client computer,
further means in the one or more medium for loading library and binary directories into random access memory as read-only files with consistency checking disabled as part of the booting of the client computer;
further means in the one or more medium for managing the loading of programs stored at the host computer requiting real-time operation so that the programs axe loaded as separate modules spaced-apart in time where the client computer is released between the loading of the separate modules to process other tasks;
further means in the one or more media medium for setting a value that corresponds to a time interval that will cause a time out error due to delay in obtaining requested information from the host computer, the value being set to be at least equal to the longest time interval that the client computer is to remain operational without being able to access the host computer.

12. The article of claim 11 further comprising means in the one or more medium for using a general purpose UNIX disk based operating system for the client computer.

13. The article of claim 12 wherein the means in the one or more medium for storing comprises only storing a kernel bootable image, root file system, and device and driver file directories in the ramdisk, and the means in the one or more medium for locking comprises locking the kernel bootable image, root file system, and device and driver file directories in the ramdisk.

14. The article of claim 11 further comprising means in the one or more medium for loading library and binary directories into random access memory as read-only files with consistency checking disabled, and means in the one or more medium for causing dynamic linking of shared files to be performed prior to the execution of the shared files.

15. The article of claim 11 wherein the means ha the one or more medium for managing periodically updates at least files stored in ramdisk that must be persistent by loading a newer version from the ramdisk down to the host computer.

* * * * *